Dec. 10, 1957   R. L. HOLLAWAY, JR., ET AL   2,815,527
HANDLE
Filed June 28, 1954
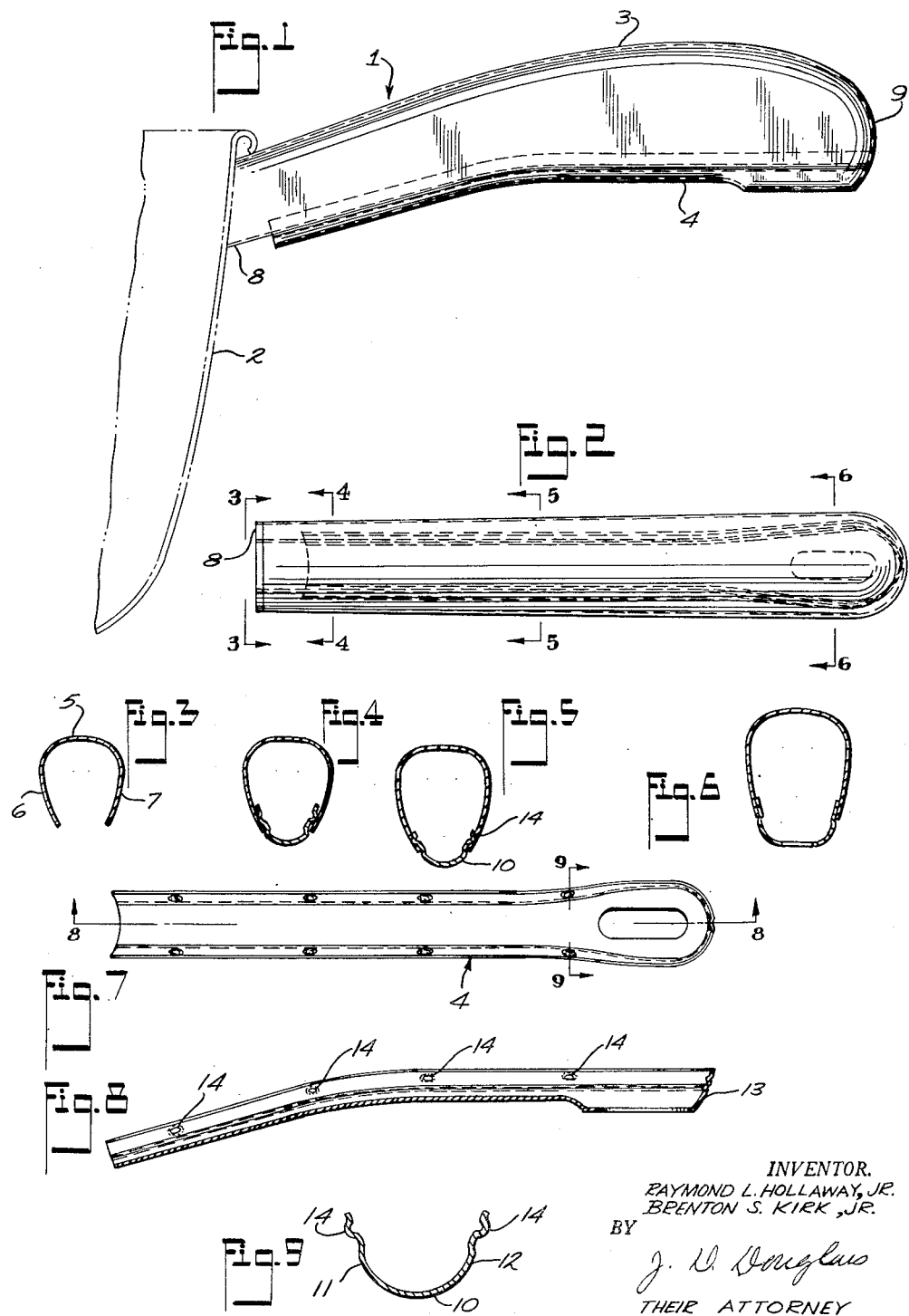
INVENTOR.
RAYMOND L. HOLLAWAY, JR.
BRENTON S. KIRK, JR.
BY
J. D. Douglas
THEIR ATTORNEY

United States Patent Office 2,815,527
Patented Dec. 10, 1957

2,815,527

HANDLE

Raymond L. Hollaway, Jr., and Brenton S. Kirk, Jr., New Philadelphia, Ohio, assignors to The Ridge Tool Company, Elyria, Ohio Application June 28, 1954, Serial No. 439,686

2 Claims. (Cl. 16—116)

The present invention relates to handles and to the process of preparing same and more particularly to handles for cooking vessels.

In vessels utilized for cooking, it has heretofore been the practice to provide generally flat but slightly concave-shaped metal handles which terminate in rectangular-shaped edges. It was also contemplated that these handles be made in tubular form but they were always of the flat variety, with the largest dimension horizontal and the smaller dimension vertical. Such handles while having a comparatively large surface area from which heat may be conducted do not provide a smooth continuous surface to be engaged by the hand. To eliminate this deficiency, it has been proposed to form the handles of plastic material. Handles for cooking vessels which are formed of noninflammable plastic material are generally suitable but such handles are expensive and consequently cannot be utilized on cooking vessels which must be sold at a comparatively low price. Furthermore such handles are expensive to mold requiring additional assembly operations which when used in conjunction with enamel ware cause frequently cracking or chipping of the enamel during assembly.

It is the aim of the present invention to provide an improved handle for cooking vessels that may be formed of sheet metal and which is constructed in such a manner that a continuous smooth surface is provided for engagement by the palm and fingers on one hand and one to which enamel may be applied. The handle of the present invention is shaped to provide a relatively large surface area to enable heat to be readily conducted therefrom and is also provided with spaced apertures, one of which is arranged adjacent the end of the handle which is attached to the cooking vessel and the other of which is arranged adjacent to the free end of the handle to enable a current of air to flow through the interior of the handle to thereby increase the surface area from which heat is conducted from the handle. The structure also provides a convenient means for hanging the same from a hook.

It is therefore an object of the present invention to provide an improved handle for cooking vessels which has a comparatively large surface area for the conduction of heat from the handle and which is shaped to provide a smooth continuous surface.

Another object of the invention is to provide an improved handle for cooking vessels formed of resilient sheet metal which is shaped to provide a continuous smooth surface for engagement by the hand and in which the handle is hollow and is provided with spaced openings to enable a current of air to flow through the interior of the handle to aid in conducting heat from the handle.

A further object of the invention is to provide an improved process by means of which the handle may be economically constructed.

The invention will be better understood by reference to the accompanying drawings in which:

Fig. 1 is a side elevational view of the handle showing it attached to a cooking vessel, the cooking vessel being shown diagrammatically with parts broken away;

Fig. 2 is a plan view of the handle shown in Fig. 1;

Fig. 3 is an end view of one end of the handle taken on a plane passing through the line 3—3 of Fig. 2, looking in the direction of the arrows;

Fig. 4 is a cross sectional view on a plane passing through the line 4—4 of Fig. 2, looking in the direction of the arrows, showing the upper and lower sections in place prior to the welding operation;

Figs. 5 and 6 are cross sectional views on planes passing through the lines 5—5 and 6—6, respectively, of Fig. 2, looking in the direction of the arrows Fig. 5, showing the handle before the upper and lower sections are welded together and Fig. 6 showing the handle after the upper and lower sections have been welded together;

Fig. 7 is a plan view of the lower section of the handle before it is assembled in place;

Fig. 8 is a cross sectional view of the lower section of the handle taken on a plane passing through the line 8—8 of Fig. 7, looking in the direction of the arrows; and Fig. 9 is an enlarged cross sectional view taken on a plane passing through the line 9—9 of Fig. 7.

As illustrated in the drawings, the handle which is designated generally by the numeral 1 has one end secured to the cooking vessel 2 by suitable means, such as welding, and extends outwardly therefrom in the usual manner.

According to the present invention the handle is formed of thin resilient sheet metal, such as 25 gauge steel, and has a comparatively large surface area so that heat will be readily conducted from its surface and to provide a smooth continuous surface for engagement with the palm and fingers of one hand, it is formed of upper and lower parts or sections 3 and 4, each having resilient side walls which are arranged in interfitting engagement with each other and are permanently welded together.

As illustrated in Figs. 2 to 6, the upper section of the handle is stamped or otherwise formed of resilient metal, such as steel, and has an upper surface 5 which may be substantially flat or which may be slightly curved as shown in the drawings and which is shaped to provide opposite sides 6 and 7 which are curved toward each other but are spaced at their lower ends at a sufficient distance from each other to receive the upwardly extending side walls of the lower section when inward pressure is applied to the side walls of the lower section.

As shown in Fig. 1, one end of the upper section terminates in a substantially flat edge 8 which is inclined downwardly to enable it to be welded to the inclined wall of a cooking vessel and the opposite end 9 is inclined downwardly to form a smooth surface, and as indicated in Figs. 3, 5 and 6, the periphery of the handle increases from the inner edge 8 to the free end 9.

The lower section of the handle as shown in Figs. 7, 8 and 9 consists of an elongated strip formed of thin resilient metal, such as steel, having a curved bottom portion 10, upwardly diverging side walls 11 and 12, and an upwardly inclined end wall 13, each of which walls has an inwardly offset portion adjacent its upper end. Each of the offset portions of the side walls of the lower section are provided with outwardly extending projections 14. The number of projections provided on each side wall will of course depend upon the length of the handle. As shown, the offset portion of each side wall of the lower section is provided with four outwardly extending projections which are substantially semispherical in shape and which are spaced at substantially equal distances from each other.

In assembling the sections to form the handle, pressure is applied to walls 11, 12 and 13 of the lower section to enable them to be inserted between the inwardly curved side walls 6 and 7 of the upper section and within the downwardly curved end wall 9 of the upper section and when the pressure on walls 11, 12 and 13 is released, they apply tension to walls 6, 7 and 9 of the upper section forcing projections 14 on each side wall of the lower section in firm seating engagement with the lower portions of the walls 6 and 7 of the upper section. Because the inwardly curved walls 6 and 7 of the upper section and the outwardly inclined walls 11 and 12 of the lower section are resilient, the walls of the lower section of the handle will be held in place by the engagement of the projections on the lower section with the walls of the upper section as illustrated more particularly in Fig. 4 and the projections of the lower section will be held under pressure in engagement with the side walls 6 and 7 of the upper section.

The lower section is then welded to the upper section. For this purpose, electrodes may be applied to the upper and lower sections to cause current to flow through the projections of the lower section and the metal of the upper section, welding the metal at the projections to the metal forming the side walls of the upper section and because the projections are on the offset portions of walls 11 and 12 of the lower section, a substantially smooth surface will be provided at the seams between the upper sections. This type of welding is known as projection welding. When the handle is comparatively short, a single welding operation will usually be sufficient, or if desired, two pairs of welding electrodes may be utilized, one pair being applied between the metal forming the upper and lower sections on one side of the handle and the other pair being applied to the upper and lower sections of the handle at the opposite side as shown in Fig. 4.

It will be noted that since the lower portion of the handle is provided with a gap adjacent the point of connection to the body of the vessel that this decreases the heat transfer to the handle as well as providing an air vent. It will also be apparent that since the handle is hollow and is provided with an opening in its bottom near the extremity that it is possible for air to circulate therethrough assisting in the cooling action.

It should be pointed out that at the extremity the end wall adjacent the hole in the bottom curves inward toward the body of the vessel and this together with the opening provides a convenient access opening which enables the pan to be hung on a hook.

Since the handle has its greatest dimension vertically it provides a good grip for the hand and reduces the tendency for the handle to turn in the hand during use.

Having thus described our invention in an embodiment thereof we are aware that numerous and extensive departures may be made therefor without departing from the spirit of the invention as defined by the appended claims.

We claim:

1. A tubular handle for cooking vessels comprising upper and lower elongated resilient metal sections, said upper section having an upper wall of substantial width for engagement by the palm of the hand and spaced side walls integral with the upper wall which extend downwardly a substantial distance from the upper wall and are curved inwardly toward each other and are also inclined forwardly with respect to the upper wall to provide an inclined front end portion for engagement with an inclined wall of the cooking vessel and said upper section having a downwardly extending end wall which is curved forwardly, said lower section having its front end spaced a short distance outwardly from the front end of the upper section to provide a first opening for the entrance of air into the tubular handle and having a curved bottom wall and upwardly extending resilient side walls which diverge outwardly from each other and a resilient end wall which extends upwardly and rearwardly from the bottom wall, each of the side walls and the end wall of the lower section having inwardly offset upper portions arranged under tension between the lower margins of the side and end walls of the upper section so that the offset portions of the side walls of the lower section will firmly engage the respective lower margins of the side walls of the upper section and the offset portion of the end wall of the lower section will firmly engage the lower margin of the end wall of the upper section, each of the side walls and the end wall of the upper section being secured to the adjacent side and end walls of the lower section to provide a substantially smooth outer surface between the walls of the upper section and the walls of the lower sectoin for engagement by the fingers of the hand, and the bottom wall of the lower section being provided with a substantially flat portion at its outer end having a second opening for the egress of air entering at the first opening and which second opening also serves as an access opening for receiving a hook to support the vessel.

2. A handle for cooking vessels, said handle comprising upper and lower resilient metal sections, said upper section being inclined upwardly to a position approaching its free end and then being inclined downwardly and forwardly and consisting of an upper wall of substantial width and downwardly and inwardly curved spaced side walls which extend a substantial distance downwardly from the upper wall and gradually increase in width from the inner to the outer portions of the handle and provide with the upper wall an inner edge for attachment to the cooking vessel, said lower section having a curved bottom wall and upwardly extending resilient side walls which diverge outwardly from each other and a resilient end wall arranged between the side walls of the lower section which extends upwardly and outwardly from the bottom wall, each of the side walls of the lower section having inwardly offset upper portions which are arranged under tension between the lower margins of the side walls of the upper section and the end wall of the lower section having an inwardly offset upper portion arranged under tension inwardly of the lower margin of the end wall of the upper section so that the offset portions of the side walls of the lower section will firmly engage the respective lower margins of the side walls of the upper section and the offset portion of the end wall of the lower section will firmly engage the lower margin of the end wall of the upper section, each of the side walls and the end wall of the upper section being secured to the adjacent side and end walls of the lower section to provide a substantially smooth outer surface between the walls of the upper and lower sections for engagement by the fingers of the hand, and the side walls of the upper section and the side walls of the lower section being of such width that the distance between the upper wall of the upper section and the bottom wall of the lower section is greater than the distance between the side walls of the upper section.

References Cited in the file of this patent

UNITED STATES PATENTS

| 605,828 | Pritchard | June 14, 1898 |
| 1,216,309 | Harrison | Feb. 20, 1917 |
| 1,749,917 | Meadowcroft | Mar. 11, 1930 |
| 1,901,176 | Lawson | Mar. 14, 1933 |

FOREIGN PATENTS

| 270,859 | Italy | Jan. 22, 1930 |
| 335,005 | France | Sept. 2, 1903 |
| 686,211 | France | July 23, 1930 |